United States Patent
Kanayama et al.

(10) Patent No.: US 11,605,304 B2
(45) Date of Patent: *Mar. 14, 2023

(54) LEARNING OF POLICY FOR SELECTION OF ASSOCIATIVE TOPIC IN DIALOG SYSTEM

(71) Applicant: INTERNATIONAL BUSINESS MACHINES CORPORATION, Armonk, NY (US)

(72) Inventors: Hiroshi Kanayama, Tokyo (JP); Akira Koseki, Tokyo (JP); Toshiro Takase, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 672 days.

This patent is subject to a terminal disclaimer.

(21) Appl. No.: 15/450,709

(22) Filed: Mar. 6, 2017

(65) Prior Publication Data
US 2018/0253987 A1  Sep. 6, 2018

(51) Int. Cl.
G09B 5/06  (2006.01)

(52) U.S. Cl.
CPC .................... *G09B 5/06* (2013.01)

(58) Field of Classification Search
CPC .................................................. G09B 5/06
See application file for complete search history.

(56) References Cited

U.S. PATENT DOCUMENTS 9,400,840 B2  7/2016  Palmert
9,536,191 B1*  1/2017  Arel ................. G06N 3/0454

2004/0236725 A1  11/2004  Amitay et al.
2009/0299496 A1  12/2009  Cade
2010/0205974 A1*  8/2010  Schneegass .......... G06N 3/0454
60/772

(Continued)

OTHER PUBLICATIONS

Pietquin, Olivier, et al. "Sample-efficient batch reinforcement learning for dialogue management optimization." ACM Transactions on Speech and Language Processing (TSLP) 7.3 (2011): 1-21. (Year: 2011).*

(Continued)

*Primary Examiner* — Li B. Zhen
*Assistant Examiner* — Henry Nguyen
(74) *Attorney, Agent, or Firm* — Tutunjian & Bitetto, P.C.; Randy Emilio Tejeda

(57) ABSTRACT

A computer-implemented method for learning a policy for selection of an associative topic, which can be used in a dialog system, is described. The method includes obtaining a policy base that indicates a topic transition from a source topic to a destination topic and a short-term reward for the topic transition, by analyzing data from a corpus. The short-term reward may be defined as probability of associating a positive response. The method also includes calculating an expected long-term reward for the topic transition using the short-term reward for the topic transition with taking into account a discounted reward for a subsequent topic transition. The method further includes generating a policy using the policy base and the expected long-term reward for the topic transition. The policy indicates selection of the destination topic for the source topic as an associative topic for a current topic.

12 Claims, 9 Drawing Sheets

(56) References Cited

U.S. PATENT DOCUMENTS

| | | | |
|---|---|---|---|
| 2013/0007137 A1 | 1/2013 | Azzam et al. | |
| 2013/0288222 A1* | 10/2013 | Stacy | G09B 5/00 434/362 |
| 2015/0139074 A1* | 5/2015 | Bane | H04W 24/08 370/328 |
| 2015/0154193 A1 | 6/2015 | Dave et al. | |
| 2015/0156268 A1 | 6/2015 | Lev et al. | |
| 2015/0261867 A1 | 9/2015 | Singal et al. | |
| 2017/0061283 A1* | 3/2017 | Rasmussen | G06N 3/0454 |
| 2017/0147949 A1* | 5/2017 | Uchibe | G06K 9/6297 |
| 2018/0032841 A1* | 2/2018 | Kluckner | G06N 3/006 |
| 2018/0032874 A1 | 2/2018 | Charles et al. | |
| 2018/0241703 A1* | 8/2018 | Feuz | G06Q 10/10 |

OTHER PUBLICATIONS

Misu, Teruhisa, et al. "Reinforcement learning of question-answering dialogue policies for virtual museum guides." Proceedings of the 13th Annual Meeting of the Special Interest Group on Discourse and Dialogue. 2012. (Year: 2012).*

Genevay, Aude, and Romain Laroche. "Transfer Learning for User Adaptation in Spoken Dialogue Systems." AAMAS. 2016. (Year: 2016).*

Thompson, Cynthia A., Mehmet H. Goker, and Pat Langley. "A personalized system for conversational recommendations." Journal of Artificial Intelligence Research 21 (2004): 393-428. (Year: 2004).*

Iglesias, Ana, et al. "Learning teaching strategies in an adaptive and intelligent educational system through reinforcement learning." Applied Intelligence 31.1 (2009): 89-106. (Year: 2009).*

Schatzmann, Jost, et al. "A survey of statistical user simulation techniques for reinforcement-learning of dialogue management strategies." The knowledge engineering review 21.2 (2006): 97-126. (Year: 2006).*

Ishizawa, Y. et al., "A Method for Conversational Topic Recommendation to Appropriate User Group" 2011 Sixth International Conference on Digital Information Management (ICDIM) (Sep. 2011) pp. 270-275.

Sunayama, W. et al., "Continuation Support of Conversation by Recommending Next Topics Relating to a Present Topic" 2016 5th IIAI International Congress on Advanced Applied Informatics (Jul. 2016) pp. 168-172.

Mahmood et al., "EmphaticTemporal-Difference Learning", Jul. 6, 2015, pp. 1-9 (Year: 2015).

U.S. Office Action issued in U.S. Appl. No. 15/800,465 dated Feb. 6, 2020, 43 pages.

Misu, Teruhisa, et al., "Reinforcement learning of question-answering dialogue policies for virtual museum guides," Proceedings of the 13th Annual Meeting of the Special Interest Group on Discourse and Dialogue, Jul. 2012, pp. 84-93.

U.S. Office Action issued in U.S. Appl. No. 15/800,465 dated Jan. 8, 2021, 55 pages.

U.S. Office Action issued in U.S. Appl. No. 15/800,465 dated May 27, 2021, 52 pages.

U.S. Office Action issued in U.S. Appl. No. 15/800,465 dated Aug. 1, 2022, 59 pages.

\* cited by examiner

FIG. 3

| source topic feature | ... | destination topic feature (t') | | | | | | |
|---|---|---|---|---|---|---|---|---|
| | | keep a bird | twitter | bird flies | wild bird | mountain | bug | ... |
| bird | ... | | | | | | | |
| π("bird", t') | ... | 0.22 | 0.1 | 0.25 | 0.13 | 0.15 | 0.09 | ... |
| R("bird", t') | ... | - | - | - | - | - | - | ... |
| Q("bird", t') | ... | - | - | - | - | - | - | ... |

| | | birdcage | running | tame bird | bird is sick | | | ... |
|---|---|---|---|---|---|---|---|---|
| keep a bird | ... | | | | | | | |
| π("keep a bird", t') | ... | 0.22 | 0.1 | 0.25 | 0.07 | | | ... |
| R("keep a bird", t') | ... | - | - | - | - | | | ... |
| Q("keep a bird", t') | ... | - | - | - | - | | | ... |

| | | cloud | climb | river | alpine plant | heaping | sumo | ... |
|---|---|---|---|---|---|---|---|---|
| mountain | ... | | | | | | | |
| π("mountain", t') | ... | 0.18 | 0.21 | 0.19 | 0.08 | 0.04 | 0.02 | ... |
| R("mountain", t') | ... | - | - | - | - | - | - | ... |
| Q("mountain", t') | ... | - | - | - | - | - | - | ... |

| | | morning | trailhead | a sea of clouds | crest | accident | | ... |
|---|---|---|---|---|---|---|---|---|
| climb | ... | | | | | | | |
| π("climb", t') | ... | 0.22 | 0.14 | 0.09 | 0.45 | 0.1 | | ... |
| R("climb", t') | ... | - | - | - | - | - | | ... |
| Q("climb", t') | ... | - | - | - | - | - | | ... |

| | | lodge | break | marriage proposal | | | | ... |
|---|---|---|---|---|---|---|---|---|
| crest | ... | | | | | | | |
| π("crest", t') | ... | 0.21 | 0.13 | 0.02 | | | | ... |
| R("crest", t') | ... | - | - | - | | | | ... |
| Q("crest", t') | ... | - | - | - | | | | ... |

| topic feature | expressions | | | |
|---|---|---|---|---|
| bird | cute | beautiful wing | ... | |
| | 0.1 | 0.1 | ... | |
| keep a bird | happy | stink | ... | |
| | 0.31 | 0.23 | ... | |
| mountain | beautiful | cold | ... | |
| | 0.16 | 0.12 | ... | |
| climb | exhilarating | ... | | |
| | 0.19 | ... | | |
| crest | amazing | awesome sunrise | good view | ... |
| | 0.3 | 0.1 | 0.3 | ... |

| source topic feature | | | | | destination topic feature | | | | | | expressions | | | | |
|---|---|---|---|---|---|---|---|---|---|---|---|---|---|---|---|
| | ... | keep a bird | twitter | bird flies | wild bird | mountain | bug | ... | | cute | beautiful wing | ... |
| bird | ... | 0.22 | 0.1 | 0.25 | 0.13 | 0.15 | 0.09 | ... | | 0.1 | 0.1 | ... |
| π("bird", t') | ... | 0.31 | ... | - | ... | 0.16 | ... | ... | | ... | ... | ... |
| R("bird", t') | ... | - | - | - | ... | - | ... | ... | | ... | ... | ... |
| Q("bird", t') | ... | birdcage | mining | tame bird | bird is sick | | | | happy | stink | |
| keep a bird | ... | 0.22 | 0.1 | 0.25 | 0.07 | | | ... | | 0.31 | 0.23 | ... |
| π("keep a bird", t') | ... | - | - | - | - | | | ... | | - | - | ... |
| R("keep a bird", t') | ... | - | - | - | - | | | ... | | - | - | ... |
| Q("keep a bird", t') | ... | cloud | river | alpine plant | heaping | sumo | | | beautiful | cold | |
| mountain | ... | 0.18 | 0.19 | 0.08 | 0.04 | 0.02 | | ... | | 0.16 | 0.12 | ... |
| π("mountain", t') | ... | 0.21 | - | - | - | - | | ... | | - | - | ... |
| R("mountain", t') | ... | 0.19 | - | - | - | - | | ... | | - | - | ... |
| Q("mountain", t') | ... | | | | | | | | exhilarating | | |
| climb | ... | | | | | | | | 0.19 | | |
| π("climb", t') | ... | - | - | - | - | - | | ... | | - | - | ... |

FIG. 5

| source topic feature | | | keep a bird | twitter | bird flies | wild bird | mountain | hug | ... |
|---|---|---|---|---|---|---|---|---|---|
| bird | π("bird", t') | ... | 0.22 | 0.1 | 0.25 | 0.13 | 0.15 | 0.09 | ... |
| | R("bird", t') | ... | 0.31 | ... | ... | ... | 0.16 | ... | ... |
| | Q("bird", t') | ... | γ max Q("keep a bird", t")+R("bird", t') | ... | ... | ... | γ max Q("mountain", t")+... | ... | ... |
| | | | birdcage | morning | tame bird | bird is sick | ... | ... | |
| keep a bird | π("keep a bird", t') | ... | 0.22 | 0.1 | 0.25 | 0.07 | ... | ... | |
| | R("keep a bird", t') | ... | ... | ... | ... | ... | ... | ... | |
| | Q("keep a bird", t') | ... | ... | ... | ... | ... | ... | ... | |
| | | | cloud | river | alpine plant | heaping | sumo | ... | |
| mountain | π("mountain", t') | ... | 0.18 | 0.19 | 0.08 | 0.04 | 0.02 | ... | |
| | R("mountain", t') | ... | 0.19 | ... | ... | ... | ... | ... | |
| | Q("mountain", t') | ... | γ max Q("climb", t")+... | ... | ... | ... | ... | ... | |
| | | | morning | a sea of clouds | trailhead | crest | accident | | |
| climb | | | | | | | | | |

FIG. 6

LEARNING OF POLICY FOR SELECTION OF ASSOCIATIVE TOPIC IN DIALOG SYSTEM

BACKGROUND

Technical Field

The present invention, generally, relates to associative topic selection technique, more particularly, to techniques for learning a policy used for selecting an associative topic in a dialog system.

Related Art

Recently, a dialog system capable of performing a conversation with a user has been developed for a variety of applications, including communication robots, answering systems for customer services, etc.

SUMMARY

According to an embodiment of the present invention there is provided a computer-implemented method for learning a policy for selection of an associative topic. The method includes obtaining a policy base that indicates a topic transition from a source topic to a destination topic and a short-term reward for the topic transition by analyzing data from a corpus. The short-term reward is defined as probability of associating a positive response. The method also includes calculating an expected long-term reward for the topic transition using the short-term reward for the topic transition with taking into account a discounted reward for a subsequent topic transition. The method further includes generating a policy using the policy base and the expected long-term reward for the topic transition. The policy indicates selection of the destination topic for the source topic as an associative topic for a current topic.

According to another embodiment of the present invention, there is provided a computer-implemented method for learning a policy for selection of an associative topic. The method includes preparing an expected long-term reward for a topic transition from a source topic to a destination topic, in which the expected long-term reward for the topic transition is obtained from a count of associating a positive expression with a topic in a corpus by taking into account a discounted reward for a subsequent topic transition. The method also includes updating the expected long-term reward for the topic transition by using a user-provided reward from user environment. The method further includes generating a policy using the expected long-term reward for the topic transition, in which the policy indicates selection of the destination topic for the source topic as an associative topic for a current topic.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The forgoing and other features and advantages of the invention are apparent from the following detailed description taken in conjunction with the accompanying drawings in which:

FIG. 3 shows an example of data structure holding a policy base, an immediate reward and an expected life-long reward for each topic transition, which may be used in offline learning process, according to the exemplary embodiment of the present invention;

FIG. 5 depicts an example of immediate reward calculation with the data structure, according to the exemplary embodiment of the present invention;

FIG. 6 depicts an example of expected life-long reward calculation with the data structure, according to the exemplary embodiment of the present invention;

DETAILED DESCRIPTION

Now, the present invention will be described using particular embodiments, and the embodiments described hereafter are understood to be only referred to as examples and are not intended to limit the scope of the present invention.

One or more embodiments according to the present invention are directed to computer-implemented methods, computer systems and computer program products for learning a policy for selecting an associative topic, in which the learned policy can be used in dialog systems to interact with a user in a series of conversations.

To improve the dialog systems so as to achieve a lot of information from the user, there is needed a technique for learning the policy for selection of the associative topics, which may include not only a topic immediately associated with user's current topic but also a softly associated topic that can be expected to increase total benefit in long-term conversations.

Hereinafter, referring to a series of FIGS. 1-8, there is described a computer system and processes for learning policies for selection of associative topics in conversations, according to an exemplary embodiment of the present invention.

In the describing exemplary embodiment, a conversation between a user and a dialog system may be represented by a topic transition between a plurality of topic features, each of which represents a respective conversational topic. A computer system for learning a topic selection policy (hereinafter, referred to as a policy learning system) according to the exemplary embodiment may perform learning process for the topic selection policy. The topic selection policy learned by the policy learning system may indicate each topic transition from a respective source topic to a respective destination topic, more specifically, occurrence probability of each topic transition from the respective source topic to the respective destination topic. By defining rewards for each topic transition, the policy learning system can optimize the occurrence probability (i.e. the topic selection policy) for each topic transition based on large scale corpus data in a framework of reinforcement learning technique.

Figure 1:
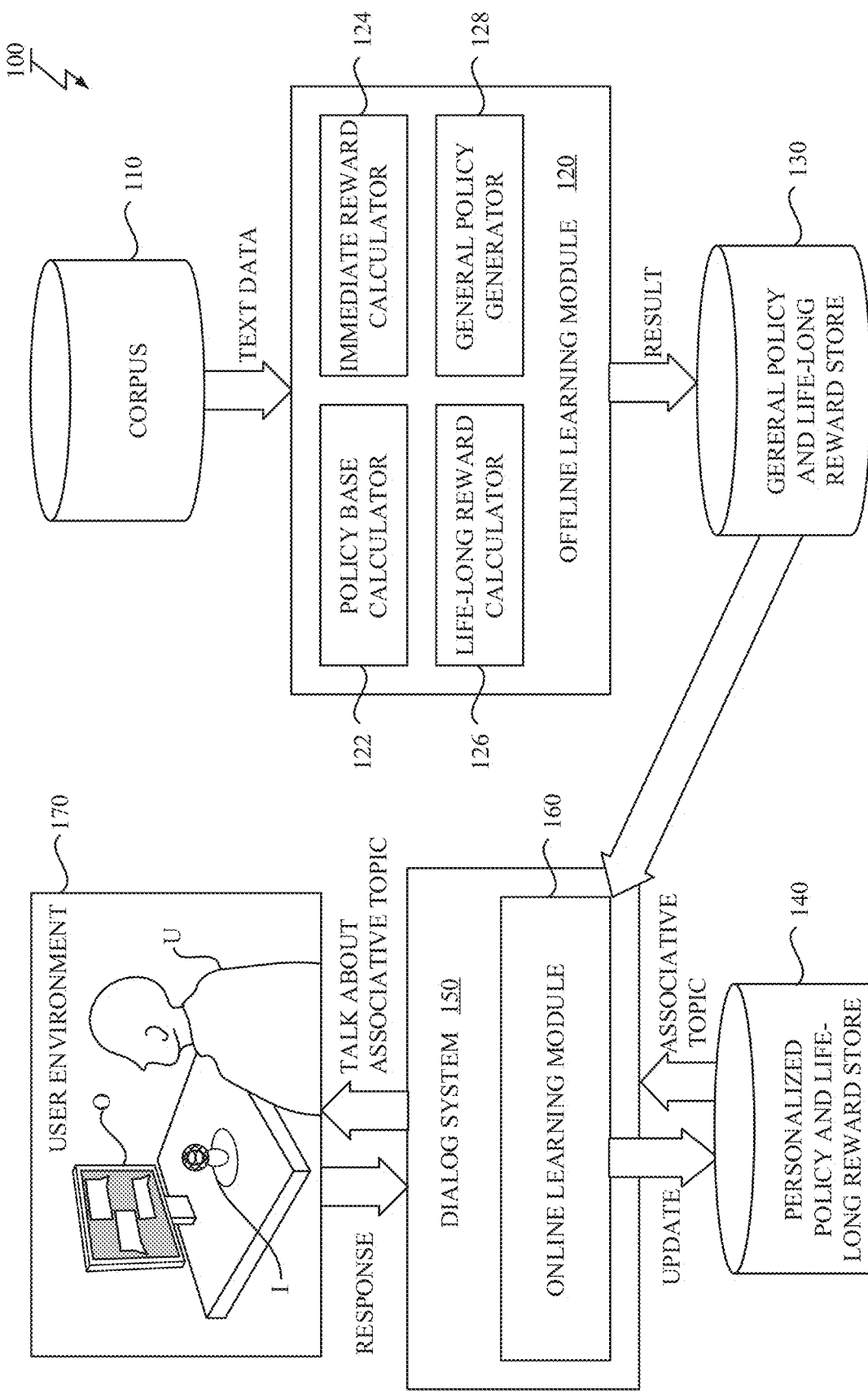
FIG. 1 illustrates a block diagram of a policy learning system for topic selection according to an exemplary embodiment of the present invention.

FIG. 1 illustrates a block diagram of a policy learning system 100 for topic selection according to the exemplary embodiment. As shown in FIG. 1, the policy learning system 100 may include a corpus 110 that provides data for learning the topic selection policy; an offline learning module 120 that performs learning processes of the topic selection policy for various users (hereinafter, a general version of the topic selection policy before personalization is referred to as the "general policy") based on the data from the corpus 110; and a general policy and life-long reward store 130 that stores deliverables including the general policy learned by the offline learning module 120 and expected life-long reward obtained in the learning process of the general policy, which will be described later.

The corpus 110 may be a database that stores large collections of conversation between speakers in a form of text information. The corpus 110 may store a set of conversational texts between various speakers in a variety of topics. The data stored in the corpus 110 may be used as training data for learning the topic selection policy.

The offline learning module 120 may perform offline learning processes based on the data from the corpus 110 to generate the general policy for various users. The learning process performed by the offline learning module 120 may be a kind of model-based automatic learning of reinforcement learning.

As shown in FIG. 1, the offline learning module 120 may include a policy base calculator 122 that calculates a policy base for each topic transition based on the data from the corpus 110; an immediate reward calculator 124 that calculates an immediate reward for each topic transition based on the data from the corpus 110; a life-long reward calculator 126 that calculates an expected life-long reward for each topic transition based on the immediate reward that is calculated by the immediate reward calculator 124; and a general policy generator 128 that generates the general policy based on the policy base and the expected life-long reward that are calculated by the policy base calculator 122 and the life-long reward calculator 126, respectively.

The policy base calculator 122 may be configured to obtain the policy base for each topic transition by analyzing the data from the corpus 110. In the describing exemplary embodiment, the topic selection policy, which may be the policy base, the general policy or personalized policy (as described later) depending on a stage of learning, may be defined as occurrence probability of each topic transition. The policy base for each topic transition can be calculated by statistically evaluating co-occurrence of topics involved in each topic transition, in the corpus 110.

The immediate reward calculator 124 may be configured to obtain the immediate reward for each topic transition by analyzing the data from the corpus 110. In the exemplary embodiment, the immediate reward may be defined as probability of associating a positive response to the topic transition. The immediate reward for each topic transition can be calculated by statistically evaluating occurrence of positive expressions in association with a topic involved in the topic transition, in the corpus 110.

The life-long reward calculator 126 may be configured to recursively calculate the expected life-long reward for each topic transition using the immediate reward for each topic transition while taking into account a discounted reward for a subsequent topic transition. The life-long reward calculator 126 may solve an equation representing the expected life-long reward for each topic transition, which may be a kind of Bellman equation, by a dynamic programming or Monte Carlo method without actual user environment, where Bellman equations and Monte Carlo methods are known. In a particular embodiment, during a course of recursive calculation, the life-long reward calculator 126 may evaluate a discounted value of maximum life-long reward received from available subsequent topic transitions after each topic transition.

The immediate reward is a kind of short-term reward in the sense that the immediate reward includes a reward received directly from current topic transition. In contrast, the expected life-long reward is a kind of long-term reward in the sense that the expected life-long reward includes not only the immediate reward but also cumulative rewards received from at least a subsequent topic transition after the current topic transition in future.

The general policy generator 128 may be configured to generate the general policy using the policy base and the expected life-long reward for each topic transition, which are obtained by the policy base calculator 122 and the life-long reward calculator 126, respectively. The general policy generator 128 may merge the occurrence probability of the policy base and probability converted from the expected life-long reward to obtain the general policy for each topic transition. The general policy generated by the general policy generator 128 may indicate selection of the destination topic for the source topic as an associative topic for a current topic in conversations.

The general policy and life-long reward store 130 may be configured to store resultants of the offline learning module 120, which may include the general policy generated by the general policy generator 128 and the expected life-long reward calculated by the life-long reward calculator 126 for the resultant general policy.

The general policy can be used by the dialog system to interact with the users as provided by the offline learning module 120. The dialog system may select an associative topic in a manner that depends on the occurrence probability distribution of available topic transitions from the current topic. For example, the dialog system can create a conversational text about a topic that has highest probability from the current topic. However, in the describing embodiment, the obtained general policy can be further subjected to online learning with the actual user environment.

For this purpose, the policy learning system 100 may further include a personalized policy and life-long reward store 140 that stores latest topic selection policy and expected life-long reward that are personalized for a specific user; and a dialog system 150 including an online learning module 160 that perform the online learning with actual user environment 170, as shown in FIG. 1.

The user environment 170 may be an environment for a specific user U, in which an output device O and an input device I for auditory and/or textual communications are provided. The output device O may be a display device, a projection device, a touch screen device, and the like for textual (or visual) communication. The output device O may be a speaker device, a headphone device, and the like for auditory communication. The input device I may be a keyboard device, a touch screen device, and the like for the textual communication. The input device I may be a microphone device, and the like for the auditory communication. The output device O for the textual communication and the input device I for the auditory communication can be used in combination as illustrated in FIG. 1, and vice versa. Also, other type of communication devices such as a braille display can be used for the output device O and input device I.

The personalized policy and life-long reward store 140 may be configured to store the latest version of the personalized policy and the expected life-long reward. In the describing embodiment, the general policy and the expected life-long reward in the store 130 can be used as initial states for the personalized policy and the expected life-long reward for the online learning. The personalized policy and the expected life-long reward stored in the store 140 may be updated by the online learning module 160 in the dialog system 150.

The dialog system 150 may be a conversational agent that is configured to converse with the user. The dialog system 150 may provide an interface to interact with the user via an appropriate way of communication. The dialog system 150 may select an associative topic for a current topic by using the policy and reward in the store 140. After selecting the associative topic, the dialog system 150 may generate conversational text based on the selected associative topic by using a simple template or a more sophisticated rule for generating conversation about a specific topic. The dialog system 150 may perform conversation with the user by outputting the generated text to the output device D in the user environment 170. Alternatively, the dialog system 150 may perform conversation with the user by outputting speech converted from the generated text to the output device using an appropriate speech engine.

The online learning module 160 included in the dialog system 150 may be configured to perform the online learning process in order to personalize the general policy for the specific user based on temporal difference learning with the user environment 170. The online learning module 160 may utilize the general policy and the expected life-long reward stored in the store 130 as initial states. The learning process performed by the online learning module 160 may be a kind of model-free and stepwise learning of reinforcement learning.

The online learning module 160 may be configured to select an associative topic by using the latest version of the personalized policy in the store 140 during the learning process. The online learning module 160 may be configured to observe a positive or negative actual response from the user environment 170 to obtain a user-provided reward. The online learning module 160 may also be configured to update current version of the personalized policy and the expected long-term reward by using the user-provided reward.

In this manner, the learned policy stored in the store 140 would be personalized for the specific user in such manner that the dialog system 150 using the learned policy can interact with the user by taking into account user-specific interests.

In particular embodiments, each of modules 110, 120 (and its submodule 122, 124, 126 and 128), 130, 140 and 150 (and its submodule 160) described in FIG. 1 may be implemented as, but not limited to, a software module including program instructions and/or data structures in conjunction with hardware components such as a processor, a memory, etc.; a hardware module including electronic circuitry; or a combination thereof. These modules 110, 120 (and its submodule 122, 124, 126 and 128), 130, 140 and 150 (and its submodule 160) described in FIG. 1 may be implemented on a single computer system such as a personal computer, a server machine, a tablet computer, a smartphone and a communication robot, or over a plurality of devices such as client-server system, a computer cluster of the computer systems in a distributed manner. Also, the offline learning module 120 and the dialog system 150 including the online learning module 160 may be implemented on separate computer systems, which include a computer system for an application developer side and a computer system for a user side.

Also, in the describing embodiment, the corpus 110 is included in the policy learning system 100 according to the exemplary embodiment. However, any known external public corpus, which includes a collection of conversations and text information, may be utilized as the corpus 110.

Hereinafter, referring to a series of FIGS. 2-7, a novel process for learning the general policy that can be used for selecting topics in the dialog system 150 is described in more detail.

Figure 2:
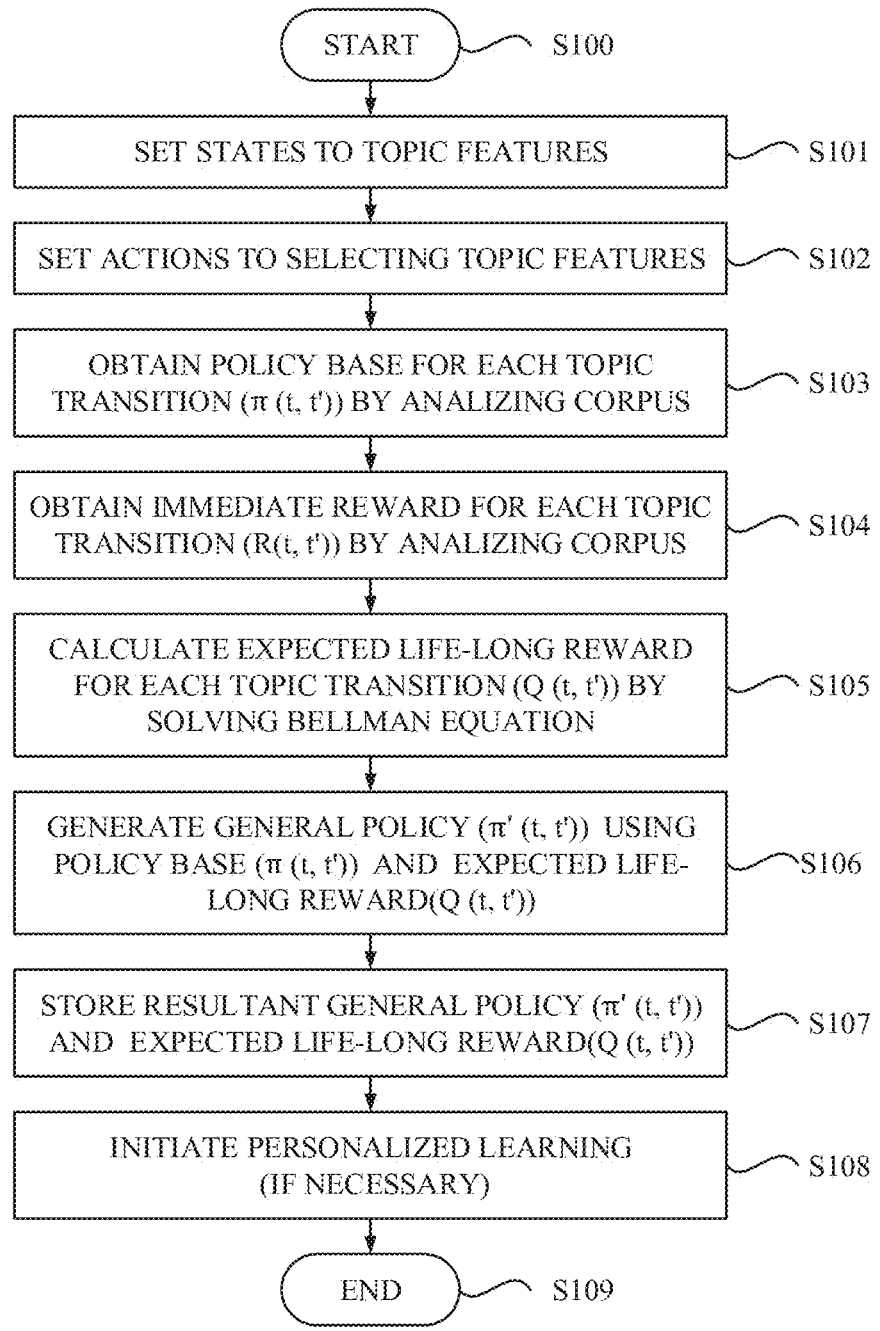
FIG. 2 is a flowchart depicting a process for learning a general policy for the topic selection according to the exemplary embodiment of the present invention.

FIG. 2 shows a flowchart depicting the process for learning the general policy for selection of associative topic in conversation, which may be performed in the policy learning system 100 shown in FIG. 1. Note that the process shown in FIG. 2 may be performed by a processing unit that implements at least the offline learning module 120 shown in FIG. 1.

The process shown in FIG. 2 may begin at step S100 in response to receiving a request for learning the general policy.

At step S101, the processing unit may set topic features ($t_1, t_2, \ldots, t_n$) as states of the reinforcement learning framework. Note that n denotes the finite number of the topic features defined in the system 100. Candidates of the topic features such as a word or an encoded phase (e.g., noun and verb clause encoded using embedding technology such as Word2Vec™) can be extracted from data in the corpus 110. In a particular embodiment, the processing unit may filter the extracted candidates by its frequency to obtain the topic features used in the system 100, for instance.

At step S102, the processing unit may set selection of topic features ($t_1', t_2', \ldots, t_n'$) as actions of the reinforcement learning framework. In a particular embodiment, the dialog system 150 may show a text "How did you think about tx' ?" on the display device using predetermined templates when selecting a specific noun (tx'), for example. In the step S102, a plurality of possible topic transitions, each of which selects the destination topic feature (one of the topic features ($t_1, t_2', \ldots, t_n'$)), may be defined for each source topic feature (one of the topic features ($t_1, t_2, \ldots, t_n$)).

At step S103, the processing unit may calculate the policy base indicating each topic transition by analyzing the data from the corpus 110. The policy base may include occurrence probability ($\pi(t, t')$) in the corpus 110 for each topic transition from the source topic feature (t) to the destination topic feature (t'). The calculation of the policy base ($\pi(t, t')$) may be done by a variety of ways that takes into account co-occurrence of topics involved in the topic transition in sentences of the corpus 110.

In one way, the processing unit may count appearance of the destination topic feature (t') around the source topic feature (t), more specifically, the destination topic feature (t')

just after the source topic feature (t), in the sentences. Then, the processing unit may estimate occurrence probability of each topic transition (π(t, t')) using a count of the appearance of each pairs of the topic features (t' and t).

In another way, the processing unit may count co-occurrence of the destination topic feature (t') with the source topic feature (t) in the sentences. Then, the processing unit may weight a count of the co-occurrence by closeness (N) between a position of the destination topic feature (t') and a position of the source topic feature (t) in the sentence. Finally, the processing unit may estimate occurrence probability of each topic transition (π(t, t')) using the count weighted by the closeness (N) as follows:

$$ae^{-bN}$$

where a and b denote appropriate constants.

FIG. 3 shows an example of a data structure used in the offline learning process. As shown in FIG. 3, the policy base (π(t, t')) may include probability distribution (set of occurrence probability for one or more destination topic features (t')) for each source topic feature (t). The cells of the policy base (π(t, t')) for each topic transition in the data structure shown in FIG. 3 would be filled by the processing of the step S103 shown in FIG. 2.

Referring back to FIG. 2, at step S104, the processing unit may obtain the immediate reward for each topic transition (R(t, t')), which may be defined as probability of associating a positive favorable response, by analyzing the data from the corpus 110. The calculation of the immediate reward (R(t, t')) may be done by a variety of ways that considers association of a topic with positive expressions.

In one way, the processing unit may count appearance of one or more positive expressions each having dependency to each destination topic feature (t') in the sentence. Then, the processing unit may estimate probability of appearance of any one of the one or more positive expressions by using the count of the appearance, as the immediate reward for each topic transition (R (t, t')) as follows:

$$R(t, t') = \sum_{pos \in positive\ expression} P(t', pos), \quad (1)$$

where P(topic, expression) denotes occurrence probability of an expression (expression) that has dependency with a topic (topic). The expressions may include predicates such as adjective clause, verb clause, noun-predicate clause, etc.

Figures 4A, 4B:
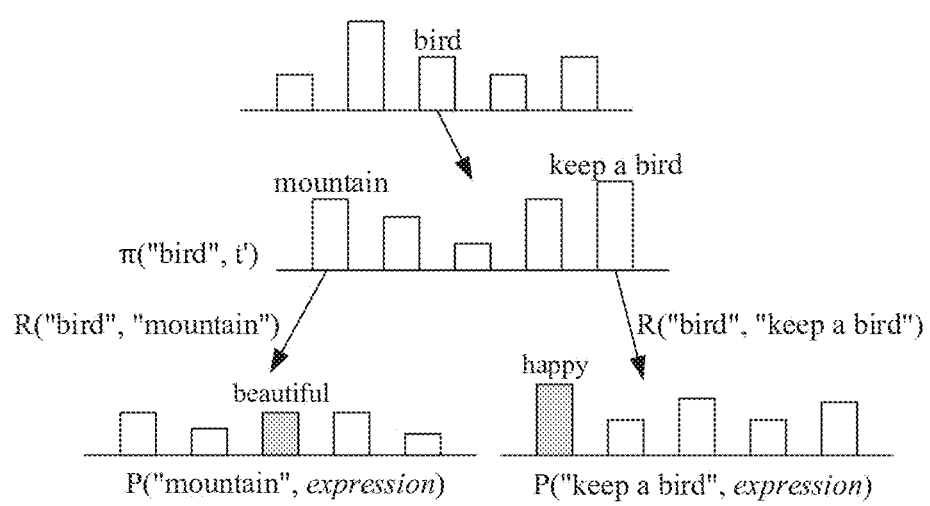
FIG. 4A shows a data structure holding occurrence probability of expressions in association with each topic feature, which may be used in the offline learning process, according to the exemplary embodiment of the present invention.
FIG. 4B depicts a schematic of immediate reward calculation according to the exemplary embodiment of the present invention.

FIG. 4A shows an example of a data structure holding occurrence probability of one or more expressions in association with each topic feature. As shown in FIG. 4A, a set of the occurrence probability for one or more expressions (including positive and non-positive expressions) are prepared for each topic feature.

The estimated probability of the appearance of any one of the positive expressions associated with the destination topic feature (t'), which can be calculated as a sum over possible positive expressions in the aforementioned equation (1), may be used as the immediate reward for the topic transitions involving the destination topic feature (R (*, t')).

In another way, as similar to the aforementioned way, the processing unit may also count appearance of the one or more positive expressions and estimate the probability of the appearance of any one of the one or more positive expressions. Finally, the processing unit may weigh the probability of the appearance by distance between the source topic feature (t) and the destination topic feature (t') as follows:

$$R(t, t') = \sum_{pos \in positive\ predicates} P(t', pos) * ce^{-d*dist(t,t')}, \quad (1')$$

where dist(t, t') denotes word distance between the source topic feature (t) and the destination topic feature (t'), which indicates semantic similarity between the source and destination topic features (t, t'), and c and d denote appropriate constants.

The probability of the positive expressions associated with the destination topic feature (t') may be used as the immediate reward for the topic transition (R (t, t')) after weighted by the distance between the source and destination topic features (dist(t, t')).

FIG. 4B depicts a schematic of immediate reward calculation. In both ways, the immediate reward for the topic transitions (e.g., R ("bird", "mountain") and R ("bird", "keep a bird")) may be calculated based on the occurrence probability of one or more expressions having dependency with the destination topic feature (e.g., P("mountain", expression) and P("keep a bird", expression)) as illustrated in FIG. 4B. By defining the immediate reward for each topic transition in accordance with the aforementioned exemplary equation (1) or (1'), a mechanism to choose a topic that has expectation associated with positive language can be implemented in the system 100.

FIG. 5 depicts an example of the immediate reward calculation with the data structure. The example shown in FIG. 5 may be illustrated as an example using the aforementioned equation (1). As shown in FIG. 5, the cells of the immediate reward for each topic transition (R (t, t')) in the data structure would be filled by the processing of the step S104 shown in FIG. 2 in accordance with the aforementioned equation (1).

For example, the immediate reward for a topic transition (R("bird", "keep a bird")) may be set by a value of occurrence probability of a positive expression "happy" associated with the topic feature "keep a bird". For example, the immediate reward for a topic transition (R("bird", "mountain")) may be set by a value of the occurrence probability of a positive expression "beautiful" associated with the topic feature "mountain".

By using the immediate reward for each topic transition, the system can foresee spontaneous development of the topic with rewards. Referring back to FIG. 2, at step S105, the processing unit may recursively calculate the expected life-long reward (or topic selection value function) for each topic transition (Q(t, t')) using the immediate reward for each topic transition (R(t, t')) while taking into account discounted reward for a subsequent topic transition as follows:

$$Q(t, t') = R(t, t') + \gamma \max_{t''} Q(t', t''), \quad (2)$$

where γ denotes a discount factor (γ<1) for evaluating a discounted value of the expected life-long reward for the subsequent topic transition.

In the aforementioned equation, a maximum life-long reward received from available subsequent topic transitions are evaluated by the second term to calculate the discounted reward. The aforementioned equation (2) that represents the expected life-long reward for each topic transition (Q(t, t')) may be called as the Bellman equation, which can be generally solved by an appropriate programming technique such as dynamic programming and/or Monte Carlo methods.

Alternatively, a life-long reward received from a subsequent topic transition from the destination topic feature (t') to a certain subsequent topic feature (t") that has maximum transition probability in the policy base (π(t, t')) can be used to calculate the discounted reward. Furthermore, an expected value of the life-long reward received from available subsequent topic transitions can be evaluated by using the policy base (π(t, t')) to calculate the discounted reward.

FIG. 6 depicts an example of expected life-long reward calculation with the data structure. As shown in FIG. 6, the cells of the expected life-long reward for each topic transition (Q(t, t')) would be filled by the processing of the step S105 shown in FIG. 2 in accordance with the aforementioned equation (2) using the maximum of the already calculated values of the expected life-long reward for the available subsequent topic transitions (Q(t, t")).

For example, an expected life-long reward (Q("bird", "keep a bird")) may be set by using the immediate reward for the topic transition (R("bird", "keep a bird")) and the maximum among the expected life-long rewards for available topic transitions from the topic feature "keep a bird" to the available topic features (t'="birdcage", "miming", "tame bird", "bird is sick" . . . ). For example, an expected life-long reward (Q("bird", "mountain")) may be set by using the immediate reward for the transition (R("bird", "mountain")) and the maximum among the expected life-long rewards for available topic transitions from the topic feature "mountain" to the available topic features (t'="cloud", "climb", "river", "alpine plant", "heaping", "sumo", . . . ).

Referring back to FIG. 2, at step S106, the processing unit may generate a general policy (π'(t, t')) for each topic transition using the policy base (π(t, t')) and the expected life-long reward (Q(t, t')) for each topic transition. The processing unit may simply merge the occurrence probability of the policy base (π(t, t')) and probability converted from the expected life-long reward (Q(t, t')) to modify the policy base (π(t, t')) by using a softmax function as follows:

$$\pi'(t, t') = \left(\pi(t, t') + \frac{\exp(Q(t, t')/T)}{\sum_{x \in X} \exp(Q(t, x)/T)}\right) / K, \quad (3)$$

where T and K denote appropriate temperature constant and normalization constant, respectively, and X denotes a set of destination topic features for the source topic feature (t).

The obtained general policy (π'(t, t')) may be a reward-considered policy that indicates selection of the destination topic (t') for the source topic feature (t) as an associative topic for a current topic. At step S107, the processing unit may store the obtained general policy (π'(t, t')) and expected life-long reward (Q(t, t')) into the store 130.

As described above, the obtained general policy can be used for associative topic selection itself in the dialog system 150. However, in order to adapt the policy to a specific user, the obtained general policy can be improved by temporal difference learning with the user environment 170. At step S108, the processing unit may personalize the general policy for a specific user by the temporal difference learning with the user environment 170 using the general policy and the expected life-long reward for the topic transition as initial states if necessary, and the process may end at step S109.

Figure 7A:
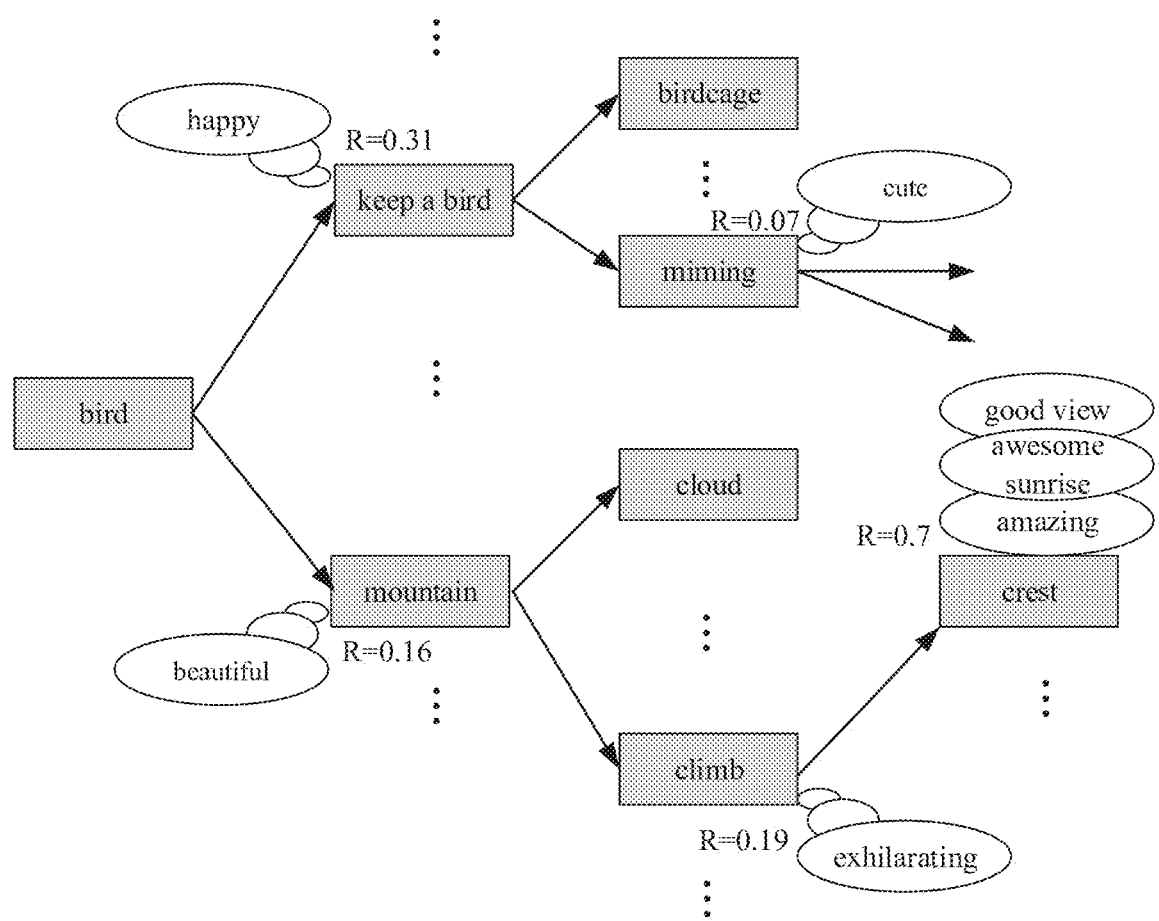
FIG. 7A describes a schematic of a sequence of topic transitions with immediate rewards.

FIG. 7A describes a schematic of a sequence of topic transitions with immediate rewards. In an illustrative example shown in FIG. 7A, the immediate reward for the topic transition from the topic feature "bird" to the topic feature "keep a bird" is larger than the immediate reward to the topic feature "mountain" (R("bird", "keep a bird")=0.31>(R("bird", "mountain")=0.16). On the other hand, there is a topic transition that has a relatively higher immediate reward (R("climb", "crest")=0.7) after taking the transition to the topic feature "mountain".

Since the expected life-long reward (Q(t, t')) includes not only the immediate reward received from the current topic transition but also the discounted cumulative reward received from subsequent topic transitions in future, the expected life-long reward for the topic transition to the topic feature "mountain" could be larger than the expected life-long reward for the topic transition to the topic feature "keep a bird" (Q("bird", "keep a bird")<(Q("bird", "mountain")).

Figure 7B:
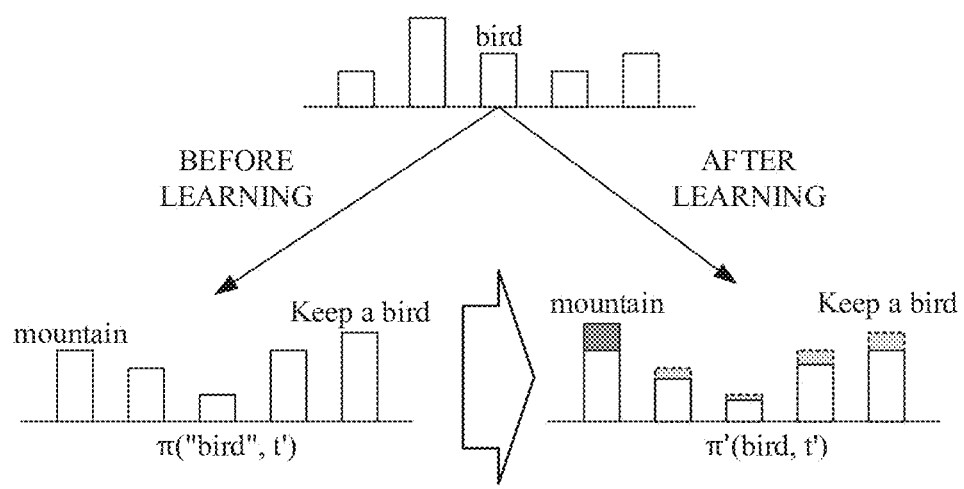
FIG. 7B describes a schematic of reflection of the expected life-long reward to the general policy according to the exemplary embodiment of the present invention.

FIG. 7B describes a schematic of reflection of the expected life-long reward to the general policy. In an illustrative example shown in FIG. 7B, after performing the offline learning process, the transition probability for the topic transition to the topic feature "mountain" (π' ("bird", "mountain")) could be increased in comparison with the policy base (π ("bird", "mountain")), which may be a reflection of a relatively high value of the expected life-long reward (Q("bird", "mountain"). The learned general policy can realize positive responsive topic suggestion.

Hereinafter, referring to FIG. 8, a novel process for learning the personalized policy that can also be used for selecting topic in the dialog system is described in more detail.

Figure 8:
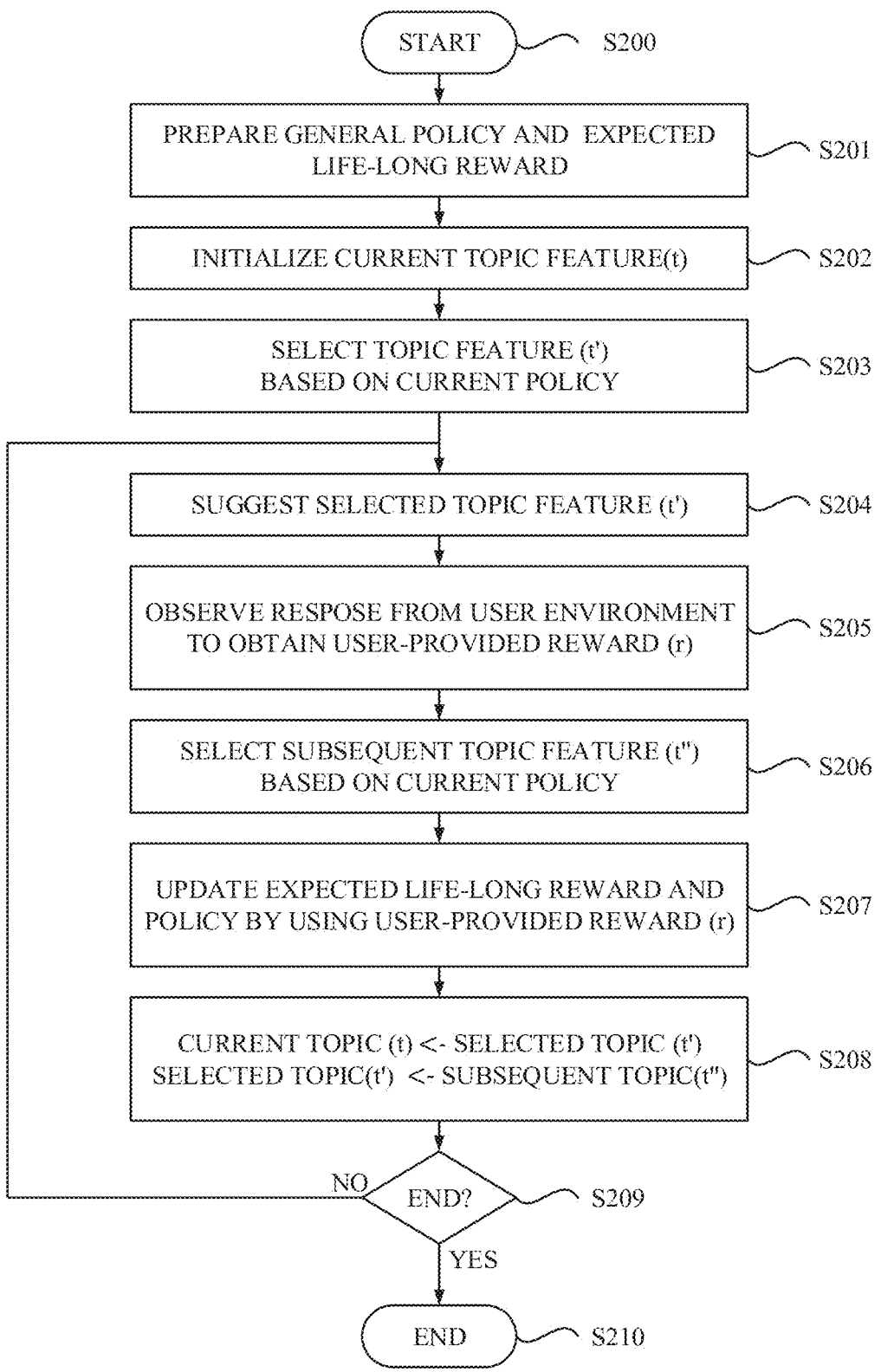
FIG. 8 is a flowchart depicting a process for learning a personalized policy for a specific user according to the exemplary embodiment of the present invention.

FIG. 8 shows a flowchart depicting the process for learning the personalized policy for selection of associative topic in conversation, which may be performed in the policy learning system 100 shown in FIG. 1. Note that the process shown in FIG. 8 may be performed by a processing unit that implements at least the online learning module 160 shown in FIG. 1.

The process shown in FIG. 8 may begin at step S200 in response to receiving a request for learning the personalized policy. The process shown in FIG. 8 may be performed in communication with the actual user environment 170 shown in FIG. 1.

At step S201, the processing unit may prepare the general policy and the expected life-long reward for each topic transition, which have already provided or are obtained by performing the process shown in FIG. 2.

At step S202, the processing unit may initialize a current topic feature (t). In the step S202, a default topic feature or one of predetermined topic features may be selected as the initial topic feature (t). At step S203, the processing unit may select an associative topic feature (t') to the current topic feature (t) using the current policy (π'(t, t')). At step S204, the processing unit may suggest the selected associative topic feature (t') to the user environment 170 through the dialog system 150.

In a particular embodiment, the general policy (π'(t, t')) and the expected long-life reward (Q(t, t')) calculated by the offline learning module 120 may be used as the current policy and the current version of the expected life-long reward. However, in other embodiments, instead of using the general policy (π'(t, t')), the processing unit can use the policy base (π'(t, t')) calculated by the policy base calculator 122 as the current policy in combination with the expected long-life reward (Q(t, t')) calculated by the offline learning module 120.

At step S205, the processing unit may observe a positive or negative actual response from the user environment 170 to obtain a user-provided reward (r). For example, a table that maps positive and/or negative expressions to specific values of the rewards can be used to obtain the user-provided reward (r) from the actual response. At step S206, the processing unit may further select an associative subsequent topic feature (t") to the selected topic feature (t') using the current policy (π'(t, t')).

At step S207, the processing unit may update current versions of the expected life-long reward (Q(t, t')) and the policy (π'(t, t')) by using the user-provided reward (r) as follows:

$$Q(t, t') = R(t, t') + \alpha[r + \gamma Q(t', t'') - Q(t, t')], \quad (4)$$

$$\pi'(t, t') = \left(\pi(t, t') + \frac{\exp(Q(t, t')/T)}{\sum_{x \in X} \exp(Q(t, x)/T)}\right) / K, \quad (5)$$

where α denotes an appropriate learning rate and γ denotes a discount factor.

In the aforementioned update equation (4), the square bracket in the second term represents a temporal difference error defined by the user-provided reward (r), the current version of the expected life-long reward (Q(t, t')) and the discounted life-long reward received from selection of subsequent topic (Q(t', t")). By using the aforementioned update equation (4), the processing unit may adjust the expected life-long reward (Q(t, t')) by the temporal difference error ([ . . . ]) with the learning rate α. Subsequently, the processing unit may update the current policy by using the updated version of the expected life-long reward for the topic transition (Q(t, t')) in accordance with the aforementioned update equation (5).

At step S208, the processing unit may change a state by setting the selected topic feature (t') and the subsequent topic feature (t") as the current topic feature (t) and the selected topic feature (t') for next iteration.

At step S209, the processing unit may determine whether the online learning process is ended or not. In response to the online learning process not being ended in step S209, control transfers to step S204 for further iterations. In response to the online learning process being ended in step S209, control transfers to step S210 and the process ends at step S210.

According to the exemplary embodiment, there can be provided a computer-implemented method, a computer system and a computer program product for learning a policy for selecting an associative topic, in which the learned policy can be used in dialog systems to interact with a user in a series of conversations.

According to the exemplary embodiment, by generating a policy for each topic transition using an expected long-term reward that takes into account probability of associating a positive response with a topic, the computer system can have capability of suggesting associative topics including not only a topic immediately associated with user's current topic but also a softly associated topic that can be expected to increase total benefit in long-term conversations, in response to the user's current topics. Thereby the dialog system can keep user's interests in conversation to achieve a lot of information from the user.

Computer Hardware Component

Figure 9:
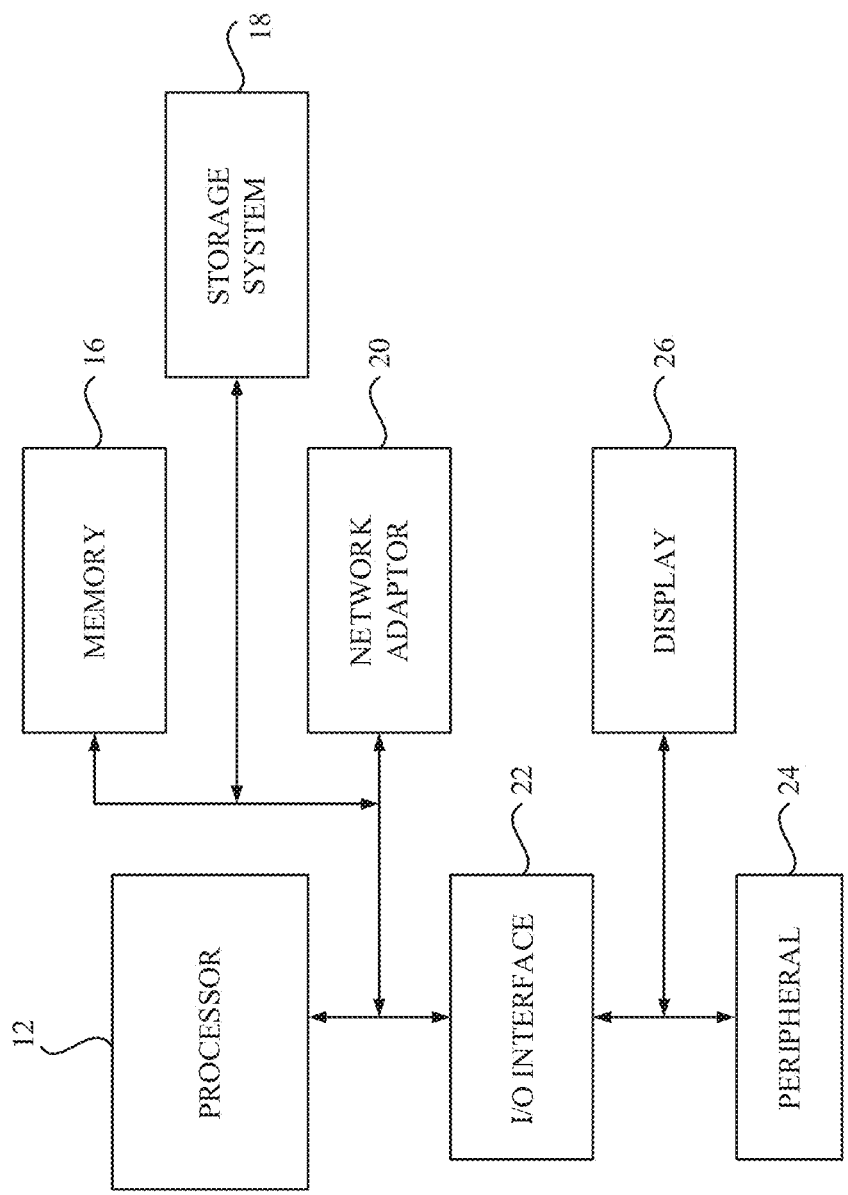
FIG. 9 depicts a computer system according to one or more embodiments of the present invention.

Referring now to FIG. 9, a schematic of an example of a computer system 10, which can be used for the policy learning system 100, is shown. The computer system 100 shown in FIG. 1 can be implemented as a computer system 10. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 9, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for selection of an associative topic using a processor-based dialog system configured for interacting with at least one user device, by executing program instructions, the computer system comprising:
   a memory tangibly storing the program instructions;
   a processor in communications with the memory for executing the program instructions, wherein the processor is configured to:
      learn a policy for the selection of an associative topic using a machine learning process, the machine learning process including online learning and offline learning, comprising:
         in response to receiving a request by at least one user, analyze data from a corpus stored on a memory associated with a hardware processor to obtain a policy base indicating a topic transition in the conversation from a source topic to a destination topic and a short-term reward for the topic transition, the short-term reward being defined as a determined probability of appearances of one or more types of positive expressions associated with the topic transition in the conversation based on an appearance count of any of the one or more types of positive expressions having a dependency to the destination topic in the conversation;
      calculate an expected long-term reward for the topic transition using the short-term reward for the topic transition with taking into account a discounted reward for a subsequent topic transition, the expected long-term reward for each topic transition ($Q(t,t')$) using the immediate reward for each topic transition ($R(t,t')$) while taking into account discounted reward for a subsequent tonic transition is determined as follows:

$$Q(t,t')=R(t,t')+\gamma \max Q(t',t''), \ldots \quad (2),$$

where $\gamma$ denotes a discount factor ($\gamma<1$) for evaluating a discounted value of the expected long-term reward for the subsequent topic transition, where Q represents the expected long-term reward function, R represents the immediate reward function, $Q(t',t'')$ represents a discounted life-long reward from a selection of a subsequent topic feature, t represents an initial topic feature, t' represents a destination topic feature, and t" represents the subsequent topic feature;
   generate a personalized policy using the policy base and the expected long-term reward for the topic transition and
   implement a dialog between a remote computing device with the at least one user device based on the personalized policy using an interface of the at least one user device, the interface being configured for user-specific personalized communication with the dialog system, the online learning and offline learning being implemented on separate computing systems including the remote developer computing device and the associated device, respectively.

2. The computer system of claim 1, wherein the processor is further configured to:
   evaluate a maximum long-term reward received from available subsequent topic transitions to calculate the discounted reward.

3. The computer system of claim 1, wherein the processor is further configured to:
   solve, by a dynamic programming or Monte Carlo method, an equation representing the expected long-term reward for the topic transition in order to calculate the expected long-term reward.

4. The computer system of claim 1, wherein the policy base includes occurrence probability of the topic transition in the corpus, the processor being further configured to:
   convert from the expected long-term reward to probability by using a softmax function; and
   merge the occurrence probability of the policy and the probability converted from the expected long-term reward.

5. The computer system of claim 1, wherein the processor is further configured to:
   select the destination topic as the associative topic for the current topic using the policy;
   observe a positive or negative actual response from user environment to obtain a user-provided reward; and
   update the expected long-term reward and the policy by using the user-provided reward.

6. The computer system of claim 1, wherein the generating the personalized policy comprises adapting a general policy for a particular user based on temporal difference learning with a user environment.

7. The computer system of claim 1, wherein the processor is further configured to generate conversational text based on the associative topic and user-specific interests.

8. The system of claim 1, wherein the processor is further configured for generating conversational text based on the associative topic and user-specific interests.

9. A computer program product for selection of an associative topic using a processor-based dialog system configured for interacting with at least one user device, the computer program product comprising a computer readable storage medium having program instructions embodied therewith, the program instructions executable by a computer to cause the computer to perform the method of:

learning a policy for the selection of an associative topic using a machine learning process, the machine learning process including online learning and offline learning, comprising:
- in response to receiving a request by at least one user, analyzing data from a corpus stored on a memory associated with a hardware processor to obtain a policy base indicating a topic transition in the conversation from a source topic to a destination topic and a short-term reward for the topic transition, the short-term reward being defined as a determined probability of appearances of one or more types of positive expressions associated with the topic transition in the conversation based on an appearance count of any of the one or more types of positive expressions having a dependency to the destination topic in the conversation;
- calculating an expected long-term reward for the topic transition using the short-term reward for the topic transition with taking into account a discounted reward for a subsequent topic transition, the expected long-term reward for each topic transition (Q(t,t')) using the immediate reward for each topic transition (R(t,t')) while taking into account discounted reward for a subsequent topic transition is determined as follows:

$$Q(t,t') = R(t,t') + \gamma \max Q(t',t''), \ldots \quad (2),$$

where γ denotes a discount factor (γ<1) or evaluating a discounted value of the expected long-term reward for the subsequent topic transition, where Q represents the expected long-term reward function, R represents the immediate reward function, Q(t',t'') represents a discounted life-long reward from a selection of a subsequent topic feature, t represents an initial topic feature, t' represents a destination topic feature, and t'' represents the subsequent topic feature;
- generating a personalized policy using the policy base and the expected long-term reward for the topic transition; and
- implementing a dialog between a remote computing device with the at least one user device based on the personalized policy using an interface of the at least one user device, the interface being configured for user-specific personalized communication with the dialog system, the online learning and offline learning being implemented on separate computing systems including the remote developer computing device and the associated device, respectively.

10. The computer program product of claim 9, wherein the generating the personalized policy comprises adapting a general policy for a particular user based on temporal difference learning with a user environment.

11. The computer program product of claim 9, further comprising generating conversational text based on the associative topic and user-specific interests.

12. The computer program product of claim 9, further comprising generating conversational based on the associative topic and user-specific interests.

* * * * *